(12) United States Patent
Nystad

(10) Patent No.: US 10,832,464 B2
(45) Date of Patent: Nov. 10, 2020

(54) GRAPHICS PROCESSING SYSTEMS FOR PERFORMING PER-FRAGMENT OPERATIONS WHEN EXECUTING A FRAGMENT SHADER PROGRAM

(71) Applicant: Arm Limited, Cambridge (GB)

(72) Inventor: Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/564,722

(22) PCT Filed: Apr. 6, 2016

(86) PCT No.: PCT/GB2016/050962
§ 371 (c)(1),
(2) Date: Oct. 5, 2017

(87) PCT Pub. No.: WO2016/162669
PCT Pub. Date: Oct. 13, 2016

(65) Prior Publication Data
US 2018/0108167 A1   Apr. 19, 2018

(30) Foreign Application Priority Data

Apr. 8, 2015 (GB) .................................. 1505951.2

(51) Int. Cl.
*G06T 15/00* (2011.01)
(52) U.S. Cl.
CPC .................. *G06T 15/005* (2013.01)
(58) Field of Classification Search
CPC .................................................. G06T 15/005
See application file for complete search history.

(56) References Cited

U.S. PATENT DOCUMENTS 6,118,452 A * 9/2000 Gannett ................ G06T 15/005
345/418
7,184,040 B1 * 2/2007 Tzvetkov .............. G06T 15/005
345/419
(Continued)

FOREIGN PATENT DOCUMENTS

JP   2014235747 A   12/2014
JP   2017517056 A    6/2017
(Continued)

OTHER PUBLICATIONS

S1CA, "Alpha Test", 2006, https://www.gamedev.net/forums/topic/391007-alpha-testing-vs-depth-testing/ (Year: 2006).*
(Continued)

*Primary Examiner* — Phong X Nguyen
(74) *Attorney, Agent, or Firm* — Vierra Magen Marcus LLP

(57) ABSTRACT

A graphics processing pipeline (30) includes a programmable fragment shader (40) that is operable to, in response to a "test" instruction included in a fragment shader program that it is executing, trigger, if appropriate, the performance of an alpha-to-coverage operation (41), a late stencil test (42), and a late depth test (43) for a fragment being processed, and to then return updated coverage information to the fragment shader (40). This allows alpha-to-coverage and late stencil and depth test operations to be triggered and performed during shader execution, rather than having to wait until shader execution has been completed before performing those operations.

22 Claims, 7 Drawing Sheets

(56) References Cited

U.S. PATENT DOCUMENTS

| | | | |
|---|---|---|---|
| 7,256,796 B1* | 8/2007 | Bastos | G06T 11/40 345/589 |
| 8,207,975 B1* | 6/2012 | Molnar | G06T 15/005 345/506 |
| 8,624,894 B2* | 1/2014 | Son | G06T 11/40 345/422 |
| 8,736,624 B1 | 5/2014 | Mahan | |
| 9,741,154 B2* | 8/2017 | Piazza | G06T 15/40 |
| 9,846,959 B2* | 12/2017 | Liao | G06T 15/405 |
| 9,865,074 B2* | 1/2018 | Berghoff | G06T 15/005 |
| 2007/0268289 A1* | 11/2007 | Yu | G06T 15/005 345/422 |
| 2007/0291030 A1* | 12/2007 | Fowler | G06T 15/405 345/422 |
| 2008/0012874 A1 | 1/2008 | Spangler | |
| 2009/0051687 A1 | 2/2009 | Kato | |
| 2011/0090251 A1 | 4/2011 | Donovan | |
| 2011/0102437 A1 | 5/2011 | Akenine-Moller | |
| 2013/0141445 A1* | 6/2013 | Engh-halstvedt | G06T 5/002 345/506 |
| 2013/0300754 A1* | 11/2013 | Everitt | G06T 15/005 345/522 |
| 2014/0118351 A1* | 5/2014 | Uralsky | G06T 15/503 345/426 |
| 2016/0035129 A1* | 2/2016 | Bolz | G06T 15/80 345/420 |
| 2016/0253838 A1* | 9/2016 | Nguyen | G06T 15/405 345/422 |
| 2018/0108167 A1* | 4/2018 | Nystad | G06T 15/005 |

FOREIGN PATENT DOCUMENTS

| | | |
|---|---|---|
| WO | WO 2007/049610 A1 | 5/2007 |
| WO | WO 2015/153162 A1 | 10/2015 |

OTHER PUBLICATIONS

PCT International Search Report dated Jul. 1, 2016, PCT Patent Application No. PCT/GB2016/050962.

Marvie, et al., "Triple Depth Culling," Internet Citation, Aug. 11, 2011, p. 1, URL: http://gautron.pascal.free.fr/publications/s2011/s2011.pdf.

PCT International Search Report dated Jul. 11, 2016, PCT Patent Application No. PCT/GB2016/050962.

PCT Written Opinion of the International Searching Authority dated Jul. 11, 2016, PCT Patent Application No. PCT/GB2016/050962.

PCT International Preliminary Report on Patentability dated Nov. 1, 2017, PCT Patent Application No. PCT/GB2016/050962.

European Search Report dated Sep. 22, 2015, GB Patent Application GB1505951.2.

AMD Accelerated Parallel Processing Technology Reference Guide, Southern Islands Instruction Set Architecture, Revision 1.1, Dec. 2012.

Nvidia Compute—PTX: Parallel Thread Execution, ISA Version 1.4, Nvidia Mar. 31, 2009.

Taiwanese Office Action dated Nov. 15, 2019, Taiwanese Application No. 105107907.

GB 1505951.2—United Kingdom Office Action dated May 21, 2020, 4 pages.

Office Action dated Jun. 29, 2020, Japanese Patent Application No. 2017-552863.

English Language specification of Japanese Unexamined Patent Application, First Publication No. 2014-235747.

Alpha to Coverage, [online], Apr. 6, 2015, URL, https://web.archive.org/web/20150406125148, https://sites.google.com/site/siv3dgameengine/article/alpha-to-coverage.

* cited by examiner

```
Start:
    INTERPOLATE_VARYINGS R0, <attribute index>, <interpolation mode>
    TEXTURE_2D R1, <texture>, <sampler>, R0, <texturing flags>
81 — TEST
    <...>
82 — BLEND R1, <render target>, <blend flags>
83 — <...>
```

80

```
Start:
    INTERPOLATE_VARYINGS R0, <attribute index>, <interpolation mode>
    TEXTURE_2D R1, <texture>, <sampler>, R0, <texturing flags>
    COMPARE_LT R1.a, 0.1        # Test if alpha is less than 0.1
    BR_NZ skip                   # Jump to label "skip" if it is
85 — DISCARD                     # Discard fragment
Skip:
81 — TEST
    <...>
82 — BLEND R1, <render target>, <blend flags>
83 — <...>
```

84

```
Start:
    INTERPOLATE_VARYINGS R0, <attribute index>, <interpolation mode>
    TEXTURE_2D R1, <texture0>, <sampler0>, R0, <texturing flags>
81 — TEST
    <...>
    TEXTURE_2D R2, <texture1>, <sampler1>, R0, <texturing flags>
    <...>
87 — EMIT_DEPTH_STENCIL R2
    <...>
82 — BLEND R1, <render target>, <blend flags>
83 — <...>
```

GRAPHICS PROCESSING SYSTEMS FOR PERFORMING PER-FRAGMENT OPERATIONS WHEN EXECUTING A FRAGMENT SHADER PROGRAM

BACKGROUND

The technology described herein relates to graphics processing systems, and in particular to the operation of graphics processing systems that include one or more programmable processing stages ("shaders").

Graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

Once the primitives have been generated and defined, they can be processed by the graphics processing system, in order, e.g., to display the frame.

This process basically involves determining which sampling points in an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output (e.g. frame to be displayed)).

The rendering process then derives the data, such as red, green and blue (RGB) colour values and an "alpha" (transparency) value, necessary to represent the primitive at the sample points (i.e. "shades" each sample point). This can involve applying textures, blending sample point data values, etc.

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

Many graphics processing systems now include one or more programmable processing stages, commonly referred to as "shaders", which execute programs to perform graphics processing operations to generate the desired graphics data. These shaders are programmable processing stages that execute shader programs on input data values to generate a desired set of output data (for processing by the rest of the graphics processing pipeline and/or for output). The shaders of the graphics processing pipeline may share programmable processing circuitry, or they may each be distinct programmable processing units.

One shader that a graphics processing pipeline may typically include is a fragment shader, that performs fragment shading operations on fragments generated by the rasteriser as part of the rendering process.

As well as the rasterisation and rendering (fragment shading) operations, graphics processing normally also includes performing a number of per-fragment operations, such as hidden surface removal or other culling tests, such as alpha to coverage and/or alpha tests, stencil tests and/or depth tests, and blending. Graphics processing APIs (standards) normally mandate that these per-fragment operations take place after fragment shading has been performed.

FIG. 1 shows an exemplary graphics processing pipeline 1 that is operable in the manner discussed above.

As shown in FIG. 1, the graphics processing pipeline 1 includes a primitive assembly stage 2, a rasterisation stage (a rasteriser) 3, a fragment shader (shader execution) stage 4 that performs fragment shading operations, an alpha to coverage stage 5 that performs alpha to coverage operations, a stencil test stage 6 that performs a stencil test, a depth test stage 7 that performs a depth test, and a blending stage 8 that performs blending operations. The output of the blending operations may then be written to memory 9 as an output of the graphics processing pipeline 1.

Although graphics processing standards (APIs) require that the various per-fragment operations such as alpha to coverage, the alpha test, the stencil test and the depth test must be performed after the fragment shading operations, it is possible to implement at least some of these tests (normally the stencil test and the depth test) before the fragment shader operation, so long as when doing that the overall process behaves as if the test has happened after the fragment shader operation (i.e. the result is the same as if the test happened after the fragment shader operation). By performing the stencil test and depth test "early" (at least where that is possible), hidden surface removal can be enhanced, such that fragment shading operations for fragments and primitives that will not actually be seen in the final output can be avoided.

FIG. 2 shows a corresponding graphics processing pipeline that has the ability to perform the stencil test and depth test "early" (i.e. before the fragment shader execution) (where that is possible).

In this case, as shown in FIG. 2, the graphics processing pipeline 20 includes an early stencil test stage 21 and an early depth stage 22 between the rasteriser 3 and the fragment shader 4. These stages perform their respective tests on fragments issued by the rasteriser 3 where the graphics processing pipeline determines that it is possible to do that.

However, as shown in FIG. 2, the pipeline must still include the "conventional" late stencil test stage 6 and late depth test stage 7 for performing those tests on fragments where it was not possible to perform those tests using the early stencil test stage 21 or an early depth test stage 22. This can be the case where, for example, alpha-to-coverage or alpha-test is enabled, or the fragment shader itself has a discard operation, changes the output coverage mask or itself determines an output depth and/or stencil value. In these cases the stencil test and depth test cannot be performed "early" (i.e. before the fragment shader).

The Applicants believe that there is scope for improvements to the operation of graphics processing pipelines that include a fragment shader and that perform one or more per-fragment operations.

BRIEF DESCRIPTION OF THE DRAWINGS

A number of embodiments of the technology described herein will now be described by way of example only and with reference to the accompanying drawings, in which:

FIGS. 5, 6 and 7 show schematically embodiments of the operation of a graphics processing system in accordance with the technology described herein.

Like reference numerals are used for like components where appropriate in the drawings.

DETAILED DESCRIPTION

Figure 1:
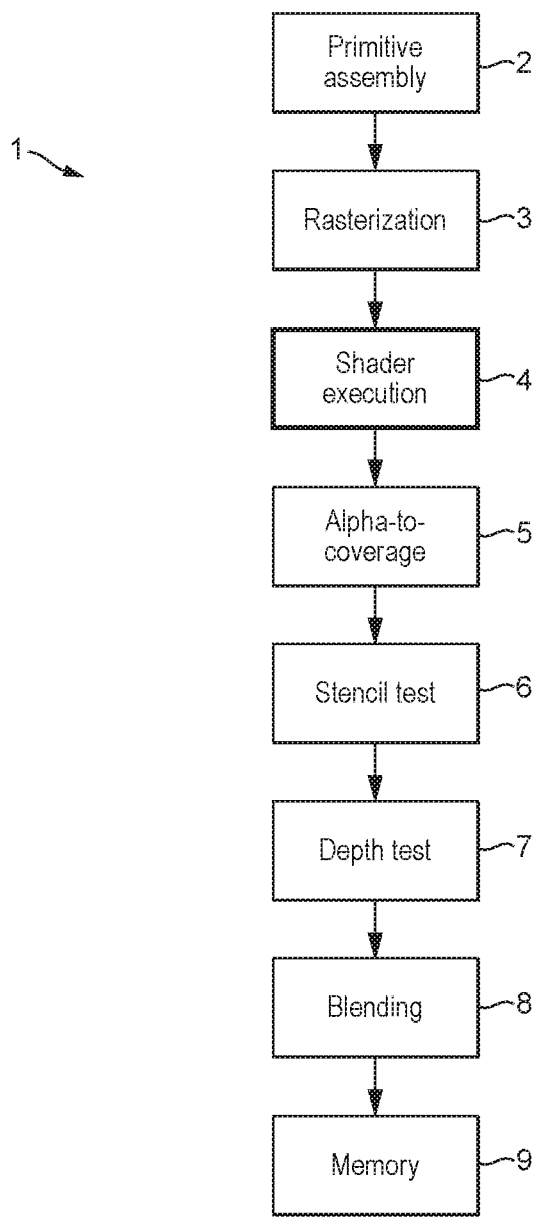
FIGS. 1 and 2 show exemplary graphics processing pipelines.
Figure 2:
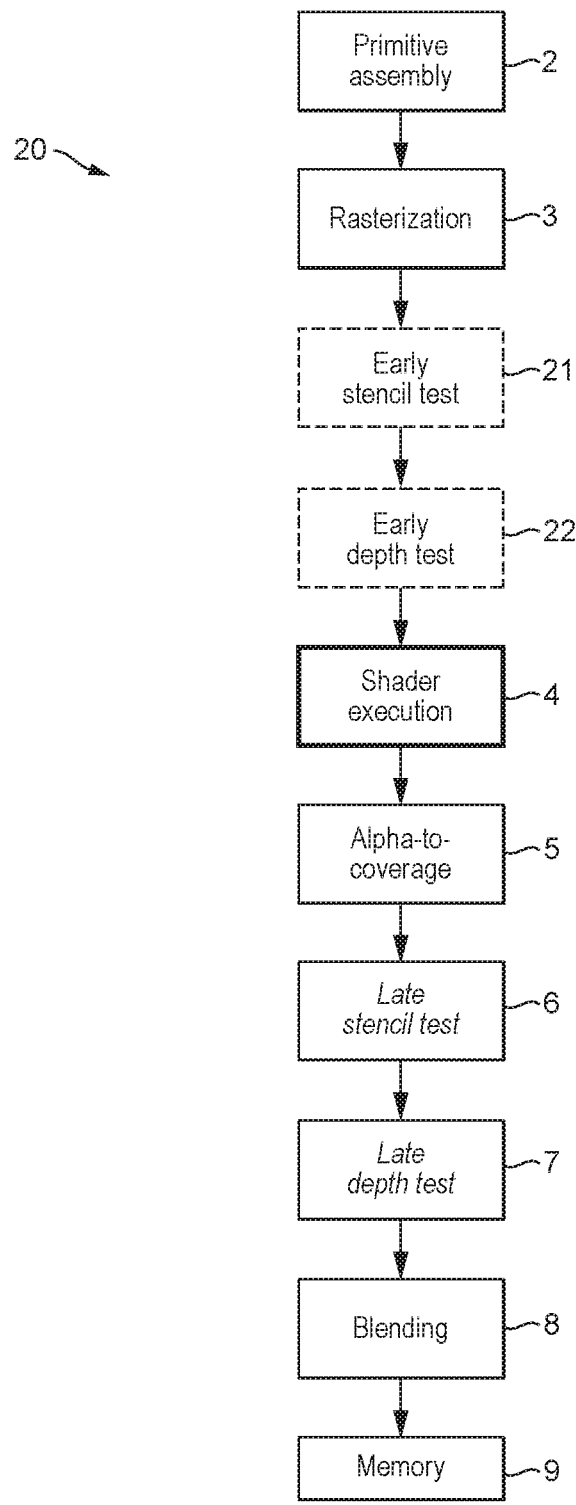

A first embodiment of the technology described herein comprises a method of operating a graphics processing system that includes a graphics processing pipeline comprising:

a plurality of processing stages, including at least a rasteriser that rasterises input primitives to generate graphics fragments to be processed, each graphics fragment having one or more sampling points associated with it; and a programmable fragment shading stage which executes fragment shader programs to perform fragment shading operations on graphics fragments generated by the rasteriser;

the method comprising:
including in a fragment shader program to be executed by the programmable fragment shading stage of the graphics processing pipeline, a graphics program instruction that when executed will cause the fragment shader to determine whether a per-fragment operation can be performed for a fragment being processed, and to, when it is determined that the per-fragment operation can be performed for a fragment being processed, trigger the performance of the per-fragment operation for the fragment being processed; and the programmable fragment shading stage of the graphics processing pipeline, when executing the fragment shader program to process a fragment, in response to the instruction:

determining whether a per-fragment operation can be performed for the fragment that is being processed; and when it is determined that a per-fragment operation can be performed for a fragment that is being processed, triggering the performance of the per-fragment operation for the fragment that is being processed, to thereby generate the result of the per-fragment operation for the fragment that is being processed.

A second embodiment of the technology described herein comprises a graphics processing system comprising:

a graphics processing pipeline comprising:
a rasteriser that rasterizes input primitives to generate graphics fragments to be processed, each graphics fragment having one or more sampling points associated with it; and a programmable fragment shading stage which executes fragment shader programs to perform fragment shading operations on graphics fragments generated by the rasteriser;

the graphics processing system further comprising:
processing circuitry configured to include in a fragment shader program to be executed by the programmable fragment shading stage of the graphics processing pipeline, a graphics program instruction that when executed will cause the fragment shader to determine whether a per-fragment operation can be performed for a fragment being processed, and to, when it is determined that the per-fragment operation can be performed for a fragment being processed, trigger the performance of the per-fragment operation for the fragment being processed; and wherein:

the programmable fragment shading stage of the graphics processing pipeline is configured to, when executing a fragment shader program to process a fragment, in response to the instruction:

determine whether a per-fragment operation can be performed for the fragment that is being processed; and when it is determined that a per-fragment operation can be performed for a fragment that is being processed, trigger the performance of the per-fragment operation for the fragment that is being processed, to thereby generate the result of the per-fragment operation for the fragment that is being processed.

In the technology described herein, an instruction that (potentially) can trigger the performance of per-fragment operations (such as, e.g., and as will be discussed below, an alpha-to-coverage operation, an alpha test, a stencil test and/or a depth test) is included in a fragment shader program that is to be executed by a fragment shading stage of a graphics processing pipeline. This then has the effect that those per-fragment operations can (potentially) be triggered and performed during execution of the fragment shader program (i.e. while the fragment shader is still running), rather than, e.g., having to wait until the fragment shading program (the fragment shader) has been completed before being able to perform those operations.

As will be discussed further below, the Applicants have recognised that this arrangement can be beneficial, as it can allow the per-fragment operation(s) to be executed earlier (i.e. whilst the fragment shader is still running) than if the fragments in question had to reach the "late" per-fragment operation stages, such as the late depth and stencil test stages, in order to undergo those operations, in those situations where it is not possible to perform the per-fragment operation(s), such as the depth and stencil tests, "early" (i.e. before the fragment shader).

In other words, the technology described herein is operable to (potentially) perform the per-fragment operations and updates that would normally be performed after the fragment shading process has been completed, whilst the fragment shading process is taking place. This then facilitates, for example, and as will be discussed further below, using the results of the per-fragment operations to (potentially) stop further execution of the fragment shading program (for example) for the fragment in question at that stage (rather than having to complete the fragment shading operation for the fragment in question and then determining using the "late" per-fragment test stages that the fragment in question can in fact be discarded). This can then save on processing resources, memory bandwidth, power, etc., required for the graphics processing in question, as the processing of fragments can (potentially) be stopped earlier in the sequence of graphics processing operations.

As will be discussed further below, the technology described herein may also allow other fragments whose tests/operations depend on the result of the per-fragment operations for a given fragment to correspondingly complete their per-fragment operations (e.g. a depth test) earlier, and thereby potentially be discarded earlier in the sequence of graphics processing operations (even if the given fragment that is to undergo the triggered per-fragment operations cannot itself be discarded).

The Applicants have recognised in this regard even if it may be the case that "early" per-fragment operations (tests), such as the depth and stencil test, may not be possible for a given fragment, primitive, etc., that is being processed (e.g. because the fragment shading operation will itself generate values that are needed for those tests), it can still be the case that during the fragment shading operation itself the value(s) necessary for performing a per-fragment operation may become available before (and/or, as will be discussed further below, the fragment shading program itself can be configured such that those values become available before) the full fragment shading operation (program) has been completed. For example, a fragment shader may determine the alpha (transparency) value for a fragment before the colour values are calculated, such that a per-fragment operation, such as alpha-to-coverage, that uses the alpha value could be performed once the alpha value is available (and before the fragment shader generates the colour values).

The technology described herein exploits this by including in the fragment shader program a "test" instruction that can trigger the per-fragment operations during execution of the shader program, e.g., and in an embodiment, once the relevant values for the per-fragment operations become available.

The technology described herein also extends to the operation of the fragment shader in response to the test instruction per se.

Thus, a third embodiment of the technology described herein comprises a method of operating a programmable fragment shading stage of a graphics processing pipeline which executes fragment shader programs to perform fragment shading operations on graphics fragments generated by a rasteriser of the graphics processing pipeline;

the method comprising:

the programmable fragment shading stage of the graphics processing pipeline, when executing a fragment shader program to process a fragment:

in response to a graphics program instruction included in the fragment shader program:

determining whether a per-fragment operation can be performed for the fragment that is being processed; and when it is determined that a per-fragment operation can be performed for a fragment that is being processed, triggering the performance of the per-fragment operation for the fragment that is being processed, to thereby generate the result of the per-fragment operation for the fragment that is being processed.

A fourth embodiment of the technology described herein comprises a programmable fragment shading stage for a graphics processing pipeline, comprising:

processing circuitry that executes fragment shader programs to perform fragment shading operations on graphics fragments generated by a rasteriser; and wherein the programmable fragment shading stage is configured to, when executing a fragment shader program to process a fragment:

in response to a graphics program instruction included in a fragment shader program:

determine whether a per-fragment operation can be performed for the fragment that is being processed; and when it is determined that a per-fragment operation can be performed for a fragment that is being processed, trigger the performance of the per-fragment operation for the fragment that is being processed, to thereby generate the result of the per-fragment operation for the fragment that is being processed.

The rasteriser of the graphics processing pipeline will generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment. To this end, each fragment that is generated by the rasteriser can, and in an embodiment does, have associated with it coverage information indicating which sampling points of the set of sampling points associated with the fragment the fragment is actually being used to render (i.e. for which sampling points the fragment is being used to generate rendered fragment data). This coverage information can be provided as desired, for example by means of a coverage mask associated with the fragment.

The rasteriser may be configured to generate the fragments for rendering in any desired and suitable manner. It will receive, e.g. primitives to be rasterised, test those primitives against sampling points and/or sets of sampling point positions, and generate fragments representing the primitives accordingly. The rasteriser can operate in any desired and suitable manner to do this.

The programmable fragment shading stage (the fragment shader) processes the fragments generated by the rasteriser to generate rendered fragment data for (covered) sampling points that the fragments represent. These fragment shading processes may include, for example, texture mapping, etc.

To perform its fragment shading processes, the programmable fragment shading stage will execute one or more graphics fragment shading programs. Each such program will, and in an embodiment does, comprise a set of graphics program instructions that are executed in the appropriate order to perform the desired fragment shading processes. In accordance with the technology described herein, the set of graphics program instructions for one or more of the fragment shading programs that the fragment shading stage will execute will include one or more "test" instructions of the technology described herein.

The fragment shading stage should, and in an embodiment does, execute the fragment shading program in question for each fragment that it receives from the rasteriser (and that the fragment shading process is to be performed for). Thus, in an embodiment, the operation of the technology described herein will be respectively performed for each fragment of a set of plural fragments that are generated by the rasteriser (and the fragment shading stage of the graphics processing pipeline will be configured accordingly).

The programmable fragment shader may comprise any suitable programmable hardware elements such as programmable processing circuitry. It may be provided as a separate circuit element to other programmable stages of the graphics processing pipeline. However, it may also be at least partially formed of shared programmable graphics processing circuitry.

The per-fragment operation(s) that the "test" instruction that is included in the fragment shader program (potentially) triggers can be any desired and suitable per-fragment operation or operations. In one embodiment it is an operation that performs a test on the fragment, such as an alpha test, a depth test and/or a stencil test. Thus, in an embodiment, the "test" instruction (potentially) triggers a per-fragment test operation (or operations).

In an embodiment, the per-fragment operation is an operation that will affect and/or determine and in an embodiment that will finalise, the fragment coverage (i.e. the sampling points that are covered (and thus being processed by) the fragment in question). This has the effect then, for example, that if the fragment coverage is (can be) determined to be zero following the execution of the test instruction (such that none of the sampling points for the fragment actually needs be rendered), then the shader program execution for the fragment in question can be (and is in an embodiment) stopped at that point.

Thus, in an embodiment, the test instruction triggers a determination of whether the coverage for the fragment is zero or not (and when it is determined that the coverage for the fragment is zero, then the fragment is in an embodiment discarded (the shader execution for the fragment is halted)).

Correspondingly, in an embodiment, the per-fragment operation that the instruction included in the shader program can trigger is one or more of, and in an embodiment all of: an alpha-to-coverage operation; an alpha test; a stencil test; and a depth test.

The instruction could be configured to trigger only one of these operations, or some (plural) or all of them.

In one embodiment, the test instruction is (in an embodiment only) able to trigger an alpha-to-coverage and/or alpha test operation. In another embodiment the instruction is (in an embodiment only) able to trigger a depth test operation. In another embodiment, the instruction is able to trigger both an alpha-to-coverage operation and a depth test operation.

The per-fragment operation(s) that is triggered by the test instruction that is included in the shader program can be performed in any desired and suitable manner (if the test instruction triggers that operation). For example, a test instruction may be operable to cause an existing functional unit of the graphics processing pipeline to perform the relevant operation. This may be suitable where, for example, the per-fragment operation is a stencil or depth test (and in an embodiment this is the case for a stencil or depth test, i.e. the test instruction triggers the performance of the stencil or depth test by an existing stencil and/or depth test stage of the graphics processing pipeline).

Additionally or alternatively, it would be possible to provide dedicated hardware in the shader core itself to perform the operation that can be triggered by the test instruction. This may be particularly suitable where the per-fragment operation is relatively simple to perform and provide in hardware, such as would be the case for an alpha-to-coverage operation. Thus, in an embodiment, where the test instruction (potentially) triggers an alpha-to-coverage operation, that operation is performed by means of dedicated hardware in the shader core.

It would also or instead be possible to perform the per-fragment operation(s) by means of a shader routine that is executed by the fragment shader. In this case, the fragment shader program could include an appropriate shader routine (set of instructions) for performing the per-fragment operation, which routine would be triggered (and thus executed by the fragment shader) if the test instruction triggers that test. This process could be implemented by, for example, the use of appropriate conditional branch commands in the shader program (or in any other suitable way).

Other arrangements for performing the per-fragment operation(s) that the test instruction triggers (if the operation(s) is triggered by the instruction) could, of course, be used if desired.

The fragment shader can determine whether the operation or operations that the test instruction relates to should be triggered (performed) for the fragment in question in any suitable and desired way. This determination is in an embodiment based on one or more criteria that can indicate whether it is appropriate to perform the per-fragment operation or operations that the test instruction relates to or not.

In an embodiment, this determination is based, at least in part, on the state, e.g. the render state, for the graphics processing task (e.g. draw call) in question.

Thus, in an embodiment whether and/or which operation(s) are (potentially) triggered by the instruction are dependent upon certain conditions or criteria being met, such as the current state (render state) for the fragment processing that is being performed. For example, and in an embodiment, the instruction may be configured to only trigger a given operation or operations if those operations are enabled (e.g. in the render state).

In an embodiment, the triggering of the per-fragment operation(s) by the test instruction is dependent upon whether the depth and/or stencil tests for the fragment in question have been completed when the test instruction is reached (falls to be executed).

If the depth/stencil tests have completed before the test instruction is reached, then the test instruction is in an embodiment operable to trigger a determination of whether the fragment coverage is zero (the coverage for the fragment is zero), and to, in an embodiment, in that event, trigger the discarding of the fragment (the stopping of the shader execution for the fragment).

This allows for the situation where the shader program may have "side effects" (i.e. can affect memory in other ways than through the resulting colour, e.g. by doing plain memory store or memory atomics), as in that case the shader program must execute even if the fragment underwent the early depth/stencil test and failed those tests (this is because the graphics standards (APIs) normally specify that those tests must be completed after the shader execution). By having the test instruction trigger a determination of whether the fragment coverage is zero, that then allows the test instruction to terminate the shader execution in the event that the fragment underwent early depth/stencil tests and that resulted in the fragment having zero coverage.

On the other hand, if the depth and stencil tests have not completed when the test instruction falls to be executed (is reached), then one or more of the per-fragment operations that the test instruction relates to are in an embodiment triggered.

In this case, in an embodiment, if the test instruction is operable to trigger an alpha-to-coverage operation (and, where appropriate, the graphics processing state is such that alpha-to-coverage or the alpha test are enabled), then the test instruction in an embodiment triggers the performance of the alpha-to-coverage and/or alpha test operation for the fragment in question.

The triggering of the per-fragment operation(s) and the per-fragment operation(s) that are triggered by the test instruction are in an embodiment also or instead (and in an embodiment also) dependent upon whether alpha-to-coverage or alpha-test are enabled and/or whether the shader program is operable to output depth and/or stencil values.

In an embodiment, if the alpha-to-coverage or alpha test operations are enabled (e.g. the render state for the graphics processing task in question has alpha-to-coverage or alpha test enabled), then the test instruction when executed triggers the performance of the alpha-to-coverage or alpha test.

Correspondingly, if the shader program does not output depth and/or stencil values, then the test instruction when executed in an embodiment triggers the performance of a depth and/or stencil test (as appropriate).

In an embodiment, the execution of the test instruction is dependent upon a depth and/or stencil "age check" (if provided) for the fragment in question, i.e. whether the fragment has completed an early depth/stencil test or is the oldest fragment at its position that hasn't yet completed the depth/stencil test. In an embodiment the execution of the test instruction requires (waits for) the depth and/or stencil age check to have completed for the fragment in question (i.e. the fragment must have completed an early depth/stencil test or be the oldest fragment at its position that hasn't yet completed the depth/stencil test for the test instruction to be executed). This can help to ensure that the fragments are tested, etc., in the order that the standard (API) requires.

If the operation or operations for the test instruction are triggered, then those operations should be performed appropriately to generate the operation results (e.g. to modify the coverage for the fragment in the case of an alpha-to-coverage operation, for example). The result of the operation is in an embodiment then used and/or stored and/or indicated in the appropriate manner. Thus, for example, and in an embodiment, the operation may output (updated) coverage information (e.g. a new coverage mask) for the fragment in question.

As well as (potentially) updating information, such as coverage information, for the fragment in question, the operation or operations that the test instruction triggers can be, and are in an embodiment, where appropriate, also used to update other information for the graphics processing operation (e.g., and in an embodiment, that may be relevant to the processing of other fragments). Thus, for example, where the test instruction triggers the performance of a depth test, then the result of that test for the fragment in question is in an embodiment used to update the depth information (e.g. the depth buffer) stored for the graphics processing task in question, e.g., and in an embodiment, so that the depth value(s) for the fragment in question is available for other (e.g. later) fragments to be tested against.

Thus, in an embodiment, if the test instruction triggers the performance of a depth and/or stencil test for the fragment in question, then the result of that test is made available to the graphics processing pipeline (e.g., and in an embodiment, to an early depth and/or stencil test stage of the graphics processing pipeline), for example, and in an embodiment, by updating a depth and/or stencil buffer. This can then facilitate the depth and/or stencil tests for later fragments being done "early" instead of "late". This may be good for overall performance.

In an embodiment, as well as triggering the relevant per-fragment processing operation if the relevant conditions are met, the test instruction can also trigger further operations and effects, for example, and in an embodiment, in dependence upon the result of the relevant per-fragment operation that the test instruction has triggered.

Thus, in an embodiment the test instruction (if executed) is operable to determine if the coverage of the fragment is zero, and if it is, to halt execution of the shader program for the fragment in question at that point (i.e. at the test instruction). In an embodiment, a coverage test is in an embodiment performed after any alpha-to-coverage or alpha test that is triggered by the test instruction has been performed, but before the performance of any (potential) depth and/or stencil tests.

Similarly, in an embodiment, once the depth/stencil test (if triggered) is completed for the fragment in question, then in an embodiment, if the coverage (e.g. the coverage mask) for the fragment ends up as zero following the depth/stencil test, then the execution of the fragment shader for the fragment in question is again in an embodiment stopped (killed) at that point. This can be implemented as desired, for example by auto-discarding the execution thread for the fragment in question if the fragment coverage reaches zero.

In an embodiment, if the blending mode is such that the fragment is always opaque, or alpha blending is enabled and the alpha value for the fragment indicates that the fragment is opaque (i.e. the alpha value is greater than or equal to 1.0), then the test instruction when executed can also (and in an embodiment does also) operate to kill off (stop the processing of) older fragments having the same position if the fragment in question passes the depth/stencil test (as those older fragments will then be known to be behind an opaque fragment and so cannot be visible).

In an embodiment, this operation is implemented using the mechanism described in the Applicant's earlier UK Patent Application GB-A-2511177.

Thus, in an embodiment, if a fragment passes the depth/stencil test that is triggered by the test instruction, then information (and in an embodiment position information) relating to the fragment that has passed the depth/stencil test triggered by the test instruction is used, e.g. by the fragment shading stage, to determine if any other fragments that are currently at the fragment shading stage (for which a fragment shader is running) will be overdrawn by the fragment that pass the depth/stencil test, and if any such fragments exist, the processing of those overdrawn fragments (i.e. their fragment shading) is (in an embodiment selectively) stopped.

Similarly, in an embodiment, if alpha blending is enabled and the alpha value indicates that the fragment is fully transparent (i.e. is less than or equal to 0.0), then the test instruction if executed triggers the depth/stencil test for the fragment (as those tests still need to be done), but as a fully transparent fragment cannot affect the colour buffer, the test instruction in an embodiment kills (stops) the fragment shader for the fragment in question (discards the fragment) once the depth/stencil tests have been completed.

Thus, in an embodiment the (or one of the) per-fragment operation that the test instruction (potentially) triggers is a determination of whether the alpha value for the fragment has a particular, in an embodiment selected, value or values (and in an embodiment to determine whether the alpha value indicates that the fragment is fully transparent or fully opaque), and the test instruction is in an embodiment further operable to trigger and/or perform a particular, in an embodiment selected, operation or operations when a fragment has the particular alpha value or one of the particular alpha values.

Thus, in an embodiment, the test instruction is operable to detect special cases for the alpha value for the fragment and to trigger a given operation or operations accordingly if the special case alpha value(s) is met.

In an embodiment, one or more, and in an embodiment all, of these operations that may be triggered by the test instruction can be set to be (potentially) triggered by the test instruction in use. Thus, in an embodiment, a graphics processing pipeline can be configured in use to perform one or more of these operations in response to the test instruction. In an embodiment each operation can be independently enabled (or disabled).

This may be configured as desired, e.g. by the appropriate setting of state information (e.g. a state bit) to indicate whether the operation in question is enabled (if the conditions for its triggering are met) or not. In an embodiment the driver for the graphics processing pipeline is able to enable or disable these operations, e.g. by setting state information appropriately.

It will be appreciated from the above, that in an embodiment, when the test instruction is executed, it is first determined whether the early depth and/or stencil test has been completed for the fragment being processed.

If it has, it is then in an embodiment determined whether the fragment coverage is zero or not. If the fragment coverage is determined to be zero, then the fragment is in an embodiment discarded (the execution of the shader program for the fragment is terminated). If the fragment coverage is determined not to be zero, then the shader execution in an embodiment progresses to the next instruction.

On the other hand, if the early depth and/or stencil test has not been completed for the fragment being processed, it is then determined whether alpha-to-coverage is enabled, and if it is, the alpha-to-coverage operation is performed to update the coverage for the fragment. It is in an embodiment then determined whether the fragment coverage is non-zero. If the fragment coverage is zero, the fragment is in an embodiment discarded, but if it is determined that the fragment coverage is non-zero, it is in an embodiment then determined whether the shader program operates to output depth or stencil values. If it does, the fragment shader in an embodiment progresses to the next instruction in the fragment shader program, but if the shader does not output depth and/or stencil values, the depth or stencil tests are in an embodiment performed. The program then advances to the next instruction.

In the case where the test instruction is not operable to trigger (potentially) all of the above operations, then the relevant operations that the test instruction is operable to trigger can be correspondingly triggered in dependence upon the indicated state and/or conditions respectively.

To facilitate its operation, the test instruction can, and in an embodiment does, take as its inputs appropriate input information to allow it to operate in the desired manner.

In an embodiment, the test instruction takes as an input the coverage (e.g. as calculated by the shader at that point) for the fragment in question and an alpha value. (Where multiple render targets are enabled, the test instruction in an embodiment uses the alpha value for render target 0, at least for any alpha-to-coverage operation.)

It in an embodiment also takes as an input (and/or has access to) the graphics state (configuration) (e.g. the render state and/or dynamic GPU (graphics processing unit) state) for the graphics processing task being performed.

The test instruction of the technology described herein can be included at any suitable and desired point in the fragment shader program that is to be executed. However, the Applicants have recognised that it can be beneficial to include the test instruction at particular points within a shader program, for example to facilitate the effect of the test instruction and/or to increase the possibility of the test instruction being able to be executed.

In an embodiment the test instruction is (preferentially) included as early as possible in the shader program (in the sequence of instructions for the shader program).

However, the Applicants have recognised that it may be beneficial for certain shader program operations (if present in the shader program) to be completed before the test instruction is (potentially) executed.

Thus, in an embodiment, the test instruction is included in the shader program after any (and all) instructions that (potentially) modify the fragment coverage (including any "discard" instructions). In other words, in an embodiment all instructions that (potentially) modify the fragment coverage are to be executed before the test instruction is (potentially) executed.

Conversely, if the shader program includes instructions that will output depth and/or stencil values, in an embodiment the test instruction is included in the shader program before the instructions that will output depth or stencil values (i.e. if the shader outputs depth or stencil values, that in an embodiment happens after the test instruction). Correspondingly, the shader program is in an embodiment arranged such that if it operates to output depth and/or stencil values, as well as that happening after the test instruction, that happens before any blend outputs of the shader program.

Similarly, in an embodiment the test instruction is included in the shader program before any instructions that generate blend outputs (i.e. any blend outputs of the shader program in an embodiment happen after the test instruction is (potentially) executed). The shader program is in an embodiment also arranged such that all blend outputs also happen after any depth and/or stencil outputs of the shader program. (However, the blend outputs themselves can occur in any desired order.)

In an embodiment, the test instruction is included in the shader program at the point where the state that the test instruction relates to (such as the coverage, the alpha value, etc.) should no longer be changed by the shader program (and the test instruction will then operate effectively to generate relevant output for that state at that point in the shader program (e.g., and in an embodiment, by executing the per-fragment operation or operations (e.g. tests) that use the state that is committed at that time). Thus, the test instruction is in an embodiment included in the shader program after the point at which the alpha value for the fragment has been generated.

In an embodiment, if the fragment shader program has "side effects" (e.g. produces data other than data that passes through the renderer), then in an embodiment the test instruction is included in the shader program after the instructions that generate any side effects that the shader program generates (i.e. any side effects generated by the shader in an embodiment occur before the test instruction is (potentially) executed). In an embodiment, the test instruction is included in the shader program immediately after the final "side effect" instruction (if possible).

The test instruction can be included in the shader program by any suitable and desired component or stage of the overall graphics processing system. In an embodiment, the test instruction is included in the shader program by the compiler for the shader in question (thus the fragment shader compiler).

The compiler can be operable to include the test instruction in the shader program in any suitable and desired manner. For example, it could consider each operation of the shader program (e.g. in turn), and determine whether the test instruction can be included before or after the operation (and so on, until all of the operations of the shader program have been considered). Other arrangements would, of course, be possible.

The technology described herein also extends to the operation of including the test instruction in a fragment shader program to be executed by a fragment shader of a graphics processing pipeline.

Thus a fifth embodiment of the technology described herein comprises a method of operating a graphics processing system comprising:

including in a fragment shader program to be executed by a programmable fragment shading stage of a graphics processing pipeline, a graphics program instruction that when executed will cause the fragment shader to determine whether a per-fragment operation can be performed for a fragment being processed, and to, when it is determined that the per-fragment operation can be performed for a fragment being processed, trigger the performance of the per-fragment operation for the fragment being processed.

A sixth embodiment of the technology described herein comprises a compiler that compiles programs to generate instructions for execution by a programmable fragment shading stage of a graphics processing pipeline, wherein the compiler is configured to:

include in a fragment shader program to be executed by a programmable fragment shading stage of a graphics processing pipeline, a graphics program instruction that when executed will cause the fragment shader to determine whether a per-fragment operation can be performed for a fragment being processed, and to, when it is determined that the per-fragment operation can be performed for a fragment being processed, trigger the performance of the per-fragment operation for the fragment being processed.

As will be appreciated by those skilled in the art, these embodiments of the technology described herein can and in an embodiment do include any one or more or all of the features of the technology described herein described herein.

In an embodiment, there is only a single test instruction of the technology described herein included at an appropriate point in the fragment shader program. However, it would also be possible to include plural test instructions of the form of the technology described herein in a given fragment shader program, if desired. In this case, each test instruction could be operable to trigger a different per-fragment operation, such as there being one test instruction operable to (potentially) trigger an alpha-to-coverage or alpha test operation, with another (e.g. later) test instruction then being operable to trigger (potentially) a depth and/or stencil test or tests.

Although as discussed above in an embodiment the test instruction of the technology described herein (if executed) triggers the performance of the depth and stencil tests, the Applicants have recognised that it can be the case that the test instruction is not able to, or is not configured to, trigger those tests, for example in the case where the shader program itself generates depth and/or stencil values.

In this case, in an embodiment, as well as including the test instruction in the shader program, a further instruction that is operable to trigger the depth and/or stencil tests is included in the shader program at an appropriate point after the test instruction (e.g., and in an embodiment, after the test instruction and after the instructions in the shader program that generate the depth and/or stencil values). This depth/stencil test instruction is in an embodiment operable to trigger the depth and stencil tests when it is executed, so as to generate depth and/or stencil values that can be used to determine whether the current fragment can be discarded and/or to provide depth and stencil values for use for testing other fragments.

This facilitates more straightforward triggering of the "late" depth and/or stencil test as part of the shader program when the initial test instruction is unable to trigger those tests, and without the need, e.g., to wait for the shader program to complete before those tests can be performed.

Again, the depth/stencil test instruction is in an embodiment included at an appropriate point in the shader program and is in an embodiment operable to send the shader calculated depth and/or stencil value or values out to the depth and/or stencil test, and to kill the shader for the fragment in question or continue rendering the fragment, depending on the result of the depth and/or stencil test.

In this arrangement, the earlier test instruction will perform all the various operations that it is configured to perform except for the depth/stencil tests, with the further depth/stencil test instruction then triggering the performance of those tests once the shader generated depth and/or stencil values are available.

Again, this depth/stencil test instruction can be included in the shader program in any desired and suitable manner. In an embodiment, the compiler for the shader program is operable to include the depth/stencil test instruction at an appropriate point in the shader program when it compiles the shader program.

The technology described herein can be used in respect of any desired shader program to be executed by the graphics processing pipeline. It may be applied in respect of some but not all of the shader programs to be executed for a given graphics processing operation (task), but in an embodiment is performed in respect of all shader programs to be executed for a given graphics processing operation.

The technology described herein can be used for all forms of output that a graphics processing pipeline may be used to generate, such as frames for display, render-to-texture outputs, etc. The output, e.g. fragment shaded data values, from the graphics processing are in an embodiment exported to external, e.g. main, memory for storage and use, such as to a frame buffer for a display.

As well as the rasteriser and fragment shader, the graphics processing pipeline can, and in an embodiment does, also contain any other suitable and desired processing stages that a graphics processing pipeline may contain such as an early depth (or an early depth and stencil) tester, a late depth (or depth and stencil) tester, a blender, a tile buffer (in the case of a tile-based graphics processing pipeline), a write out unit, etc.

In embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein is applicable to any suitable and desired form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or processing circuitry and/or programmable hardware elements and/or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing system and pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

Figure 3:
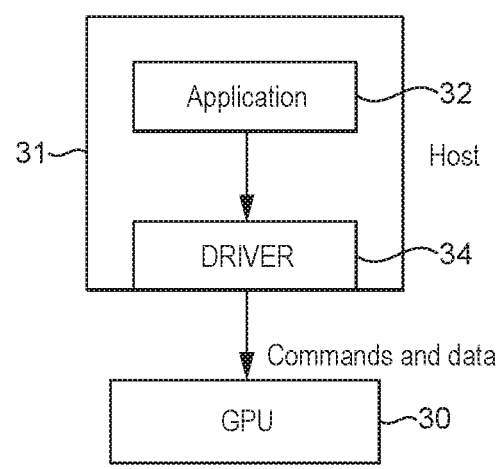
FIG. 3 shows an exemplary computer graphics processing system.

FIG. 3 shows a typical computer graphics processing system.

An application 32, such as a game, executing on a host processor 31 will require graphics processing operations to be performed by an associated graphics processing unit (graphics processing pipeline) 30. To do this, the application will generate API (Application Programming Interface) calls that are interpreted by a driver 34 for the graphics process pipeline 30 that is running on the host processor 31 to generate appropriate commands to the graphics processor 30 to generate graphics output required by the application 32. To facilitate this, a set of "commands" will be provided to the graphics processor 30 in response to commands from the application 32 running on the host system 31 for graphics output (e.g. to generate a frame to be displayed).

Figure 4:
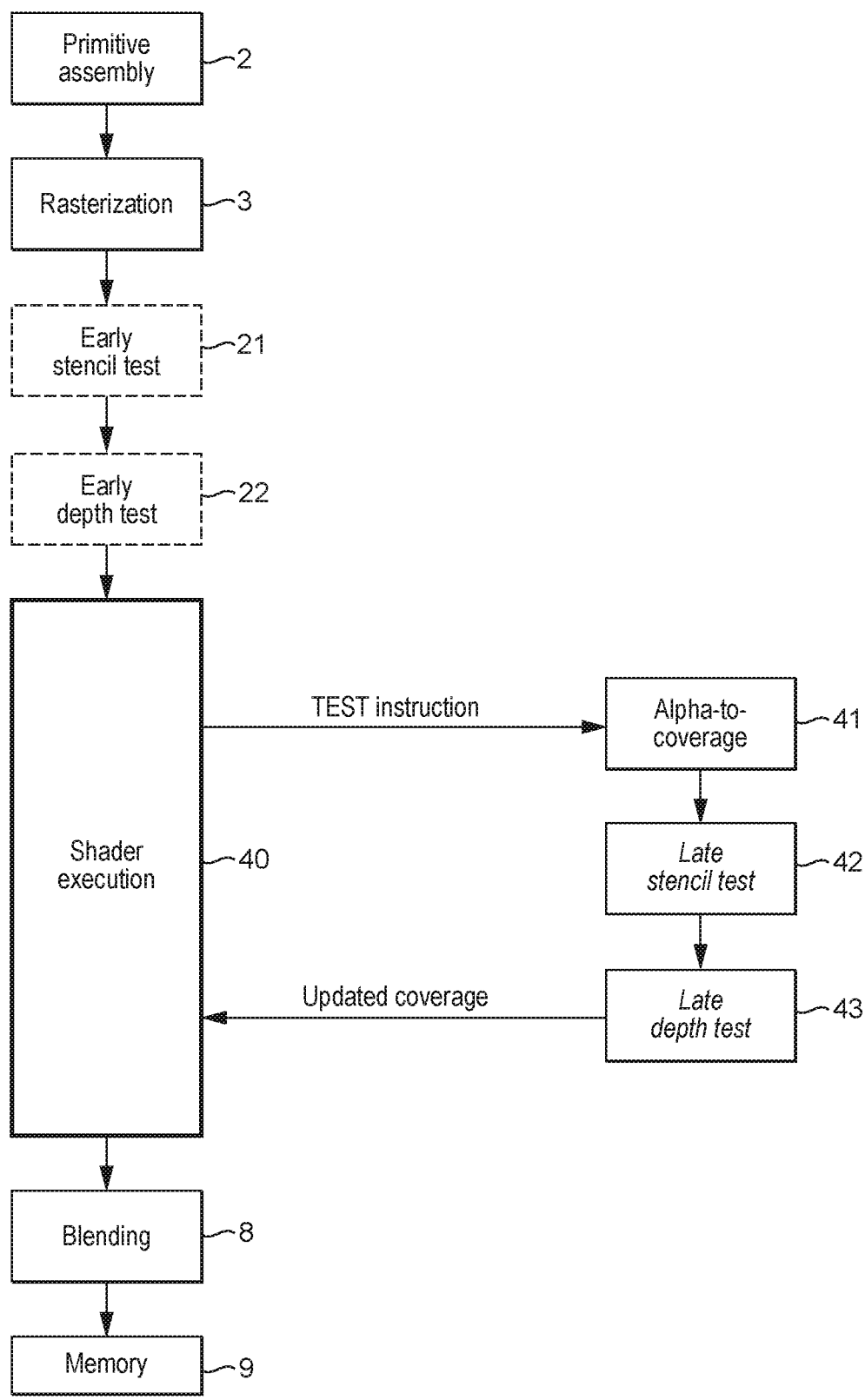
FIG. 4 shows schematically a graphics processing pipeline that operates in the manner of the technology described herein.

FIG. 4 shows schematically a graphics processing pipeline 30 that operates in accordance with the technology described herein.

FIG. 4 shows the main elements and pipeline stages of the graphics processing pipeline 30 that are relevant to the operation of the present embodiment. As will be appreciated by those skilled in the art there may be other elements of the graphics processing pipeline that are not illustrated in FIG. 4. It should also be noted here that FIG. 4 is only schematic, and that, for example, in practice the shown functional units and pipeline stages may share significant hardware circuits, even though they are shown schematically as separate stages in FIG. 4. It will also be appreciated that each of the stages, elements and units, etc., of the graphics processing pipeline as shown in FIG. 4 may be implemented as desired and will accordingly comprise, e.g., appropriate circuitry and/or processing logic, etc., for performing the necessary operation and functions.

FIG. 4 shows schematically the pipeline stages starting with the assembly of the graphics primitives (polygons) 2 for input to the rasterisation process. Thus, at this point the graphics data (the vertex data) has undergone fragment frontend operations, such as transformation and lighting operations (not shown). A primitive set-up (assembly) stage 2 then set-ups (assembles) the primitives to be rendered, in response to the commands and vertex data provided to the graphics processor.

As shown in FIG. 4, the graphics processing pipeline 30 then includes a number of further stages, including a rasterisation stage 3, an early stencil test stage 21, an early depth test stage 22, a renderer in the form of a fragment shading stage 40, and a blending stage 8.

The rasterisation stage 3 of the graphics processing pipeline 30 operates to rasterise the primitives making up the render output (e.g. the image to be displayed) into individual graphics fragments for processing. To do this, the rasteriser 3 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early stencil test stage 21 performs (where appropriate) a stencil test on fragments it receives from the rasteriser 3.

The early depth test stage 22 performs (where possible) a depth test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer to determine whether the new fragments will be occluded by fragments that have already been rendered (or not)).

Fragments that pass (or that do not undergo) the fragment early Z and stencil tests are then sent to the fragment shading stage 40. The fragment shading stage 40 performs the appropriate fragment processing operations on the fragments it receives, so as to process the fragments to generate the appropriate rendered fragment data.

In the present embodiment, the fragment shading stage 40 is in the form of a shader pipeline (a programmable fragment shader). The fragment shader 40 is thus a programmable processing stage that executes shader programs on input data values to generate a desired set of output data, e.g. for processing by the rest of the graphics pipeline and/or for output.

The fragment processing performed by the fragment shader 40 may include any suitable and desired fragment shading processes, e.g. to apply textures, fogging and other effects to the fragments, to generate the appropriate "fragment shaded" fragment data.

The fragments that complete the fragment shading stage 40 are then subjected to, if required, any necessary blending operations (e.g. shading with other fragments) in a blender 9. Any other remaining operations necessary on the fragments, such as dither, etc. (not shown) are also carried out at this stage.

Finally, the (blended) output fragment data (values) are written to memory 9 from where they can, for example, be output to a frame buffer for a display. (In the case of a tile-based graphics processing pipeline, the output fragment data values may first be written to a tile buffer (not shown) before being written out to main memory 9.)

The writing of the data to memory 9 may include downsampling the fragment data to the appropriate resolution for the output buffer, if desired (e.g. such that an array of pixel data corresponding to the pixels of an output device is generated).

The render output data array may, as is known in the art, typically be an output frame intended for display on a display device, such as a screen or printer, but may also, for example, comprise intermediate data intended for use in later rendering passes (also known as a "render to texture" output), etc.

The process is then repeated for the next render output (e.g. frame) and so on.

Other arrangements for the graphics processing pipeline 30 would, of course, be possible.

The above describes certain features of the operation of the graphics processing pipeline shown in FIG. 4. Further features of the operation of the graphics processing pipeline shown in FIG. 4 in accordance with embodiments of the technology described herein will now be described.

As shown in FIG. 4, in the present embodiment, the fragment shader 40 is operable to, in response to a "test" instruction included in a fragment shader program that it is executing, trigger, if appropriate, the performance of an alpha-to-coverage operation 41, a late stencil test 42, and a late depth test 43 for a fragment being processed, and to then, e.g., return updated coverage information to the fragment shader 40. To do this, the test instruction takes as its inputs, inter alia, the current coverage and an alpha value (and, where appropriate, depth and stencil values) for the fragment and the current graphics processing (render) state, and can provide as an output, inter alia, updated coverage information for the fragment.

This allows alpha-to-coverage and late stencil and depth test operations to be triggered and performed (potentially) during shader execution, rather than having, e.g., to wait until shader execution has been completed before performing those operations.

Figure 5:
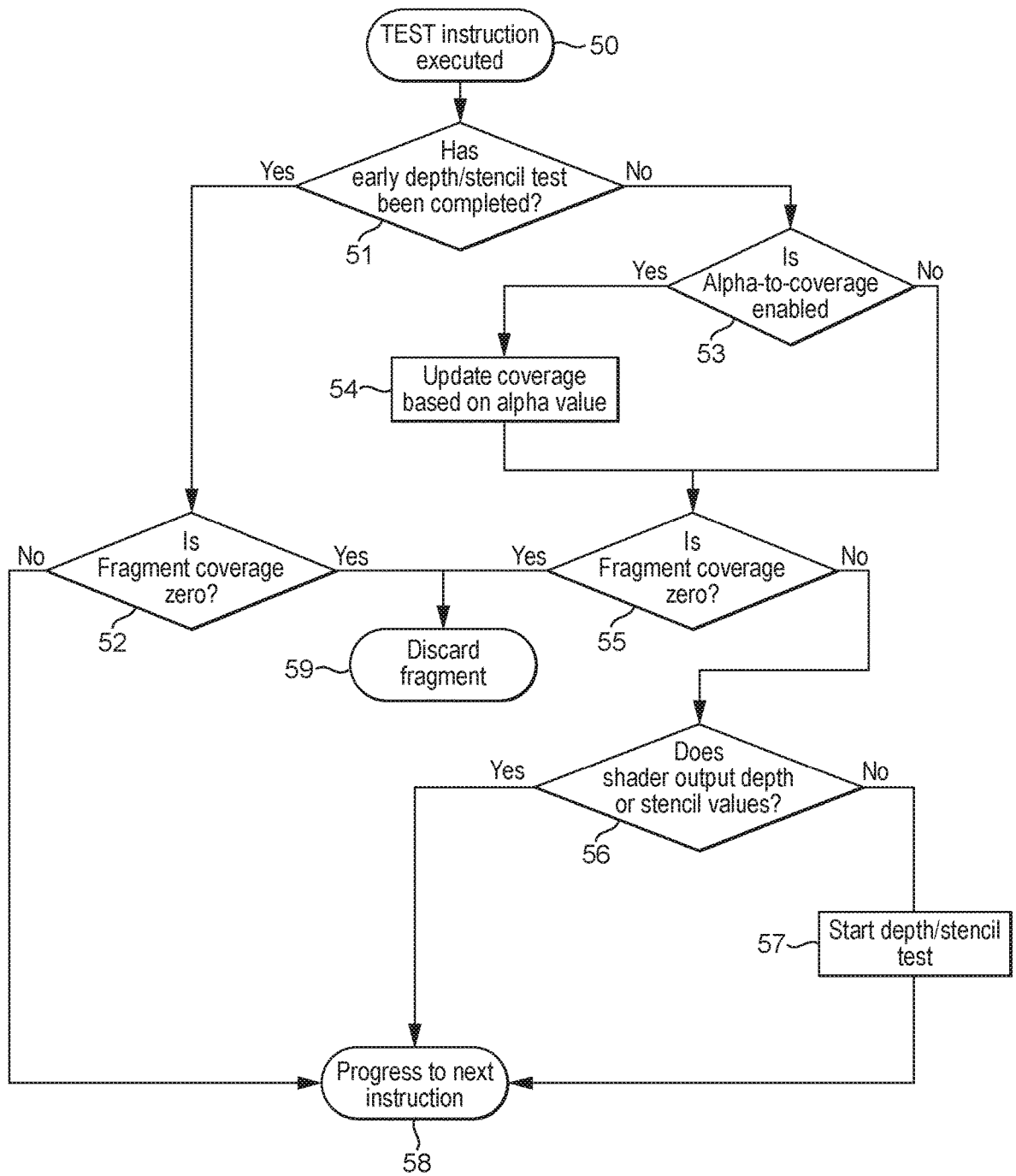

FIG. 5 shows schematically and in more detail the operation of the graphics processing pipeline 30 shown in FIG. 4 when the test instruction is executed (step 50). (The fragment shader 40 when executing a shader program for processing a fragment will execute each instruction in the shader program in turn, but when it reaches the test instruction will operate in the manner described below.)

As shown in FIG. 5, when the test instruction is executed, it is first determined whether the early depth/stencil test has been completed for the fragment being processed (step 51). If the early depth/stencil test has been completed for the fragment in question, it is then determined whether the coverage for the fragment is zero (step 52). If the fragment coverage is determined to be zero, then the fragment is discarded (step 59) (i.e. the fragment shader execution for the fragment in question is halted at this point). On the other hand, if the fragment coverage is determined to be non-zero (i.e. there are still covered sampling positions that the fragment is to be used to render), then the fragment shader execution progresses to the next instruction (step 58).

If the early depth/stencil test has not been completed for the fragment, then it is determined whether alpha-to-coverage operation is enabled (in the state for the graphics processing task being performed) (step 53). If the alpha-to-coverage operation is enabled, then the test instruction triggers the alpha-to-coverage operation and updates the coverage for the fragment based on the alpha value (step 54).

In the present embodiment, the alpha-to-coverage operation is performed by means of dedicated hardware in the fragment shader execution core. Other arrangements for this would be possible. (The alpha-to-coverage operation will proportionally remove coverage for the fragment based on the alpha value for the fragment (and so will, e.g., remove sample positions from the fragment if the alpha value indicates that the fragment is at least partially transparent).)

Once the coverage has been updated (or if the alpha-to-coverage operation is not enabled), it is then determined whether the fragment coverage is zero (step 55). If the fragment coverage is determined to be zero, then the fragment is discarded (step 59) (i.e. the fragment shader execution for the fragment in question is halted at this point).

On the other hand, if the fragment coverage is determined to be non-zero (i.e. there are still covered sampling positions that the fragment is to be used to render), it is then determined whether the shader program is operable to output depth or stencil values (step 56). (Again this can be determined, e.g., from the state for the graphics processing task in question.) If it is determined that the shader program is to output depth or stencil values, then the execution proceeds to the next instruction for the program (step 58).

If the shader program is not operable to output depth or stencil values (i.e. such that the final depth and stencil values are available at this point), then the test instruction triggers the performance of the depth and/or stencil tests (as appropriate) for the fragment in question (step 57).

In the present embodiment, the depth and stencil tests are performed using the existing depth and stencil test stages of the graphics processing pipeline (thus the test instruction triggers the operation of those stages to perform the depth and stencil test for the fragment). Again, other arrangements would be possible if desired.

If the fragment passes the depth and stencil tests, the shader execution then proceeds to the next instruction in the shader program (step 58). Otherwise, the fragment is discarded (the shader execution for the fragment is stopped) (i.e. if the coverage for the fragment ends up as zero following the depth/stencil test, then the execution of the fragment shader for the fragment in question is stopped (killed) at that point).

In the present embodiment, the test instruction for performing the above operation is included in the fragment shader program (instruction stream) for the fragment shader execution stage 40 of the graphics processing pipeline by the shader compiler for the graphics processing pipeline.

The compiler may, e.g., run on the host processor 31 of the data processing system that includes the graphics processing pipeline 30. (The compiler may, e.g., be part of the driver 4, with there, e.g. being a special API call to cause the compiler to run. The compiler execution can thus be part of the graphics processing preparation done by the driver in response to API calls generated by an application). However, other arrangements would be possible, such as the compiler running on the same processor as the compiled code, or the compiler being run on a separate processor, such as the program being pre-compiled on a separate system and being distributed in a compiled form.

Figure 6:
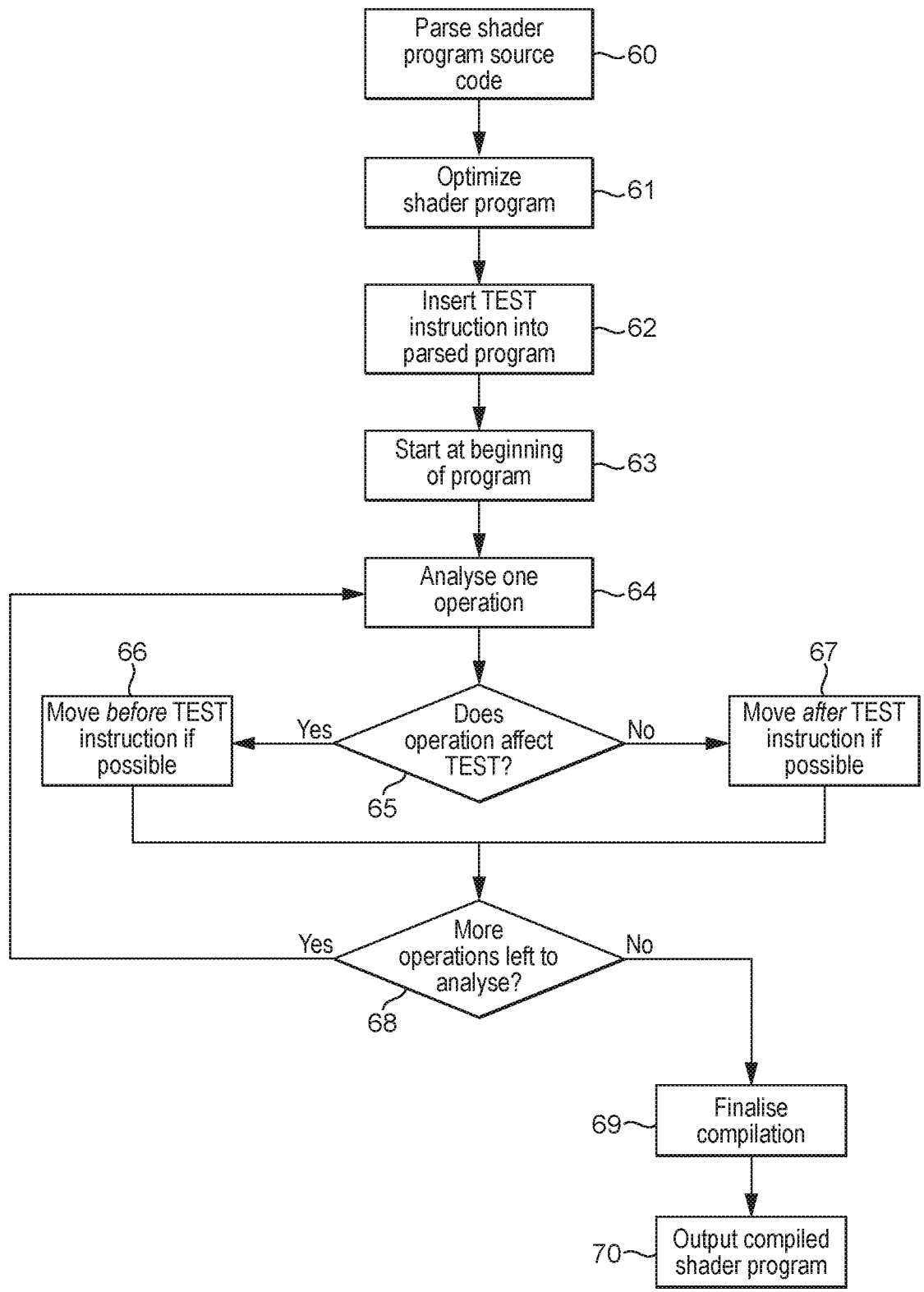

FIG. 6 shows schematically an embodiment of the operation of the compiler to include a test instruction in a shader program to be executed by a fragment shader of a graphics processing pipeline.

The shader compiler will receive a shader program in a high level programming language to be compiled, and, as shown in FIG. 6, first parse the shader program source code and then optimise the shader program (e.g. in accordance with its normal compiler operation) (steps 60 and 61).

The compiler then inserts the test instruction into the parsed program (step 62).

The compiler then performs a sequence of steps to determine the desired position for the test instruction in the parsed shader program.

Thus, starting at the beginning of the shader program (step 63), the compiler will analyse the first shader operation (step 64) and determine if that shader operation affects the test instruction (step 65) (e.g. will have an effect on a value that the test instruction will use or not).

If it is determined that the shader operation will affect the test instruction, then that operation is moved to be executed before the test instruction if possible (step 66). Conversely, if it is determined that the shader operation in question will not affect the test instruction, then that operation is moved to be executed after the test instruction if possible (step 67).

This is then repeated for all the operations that the shader program executes (step 68).

In the present embodiment, the test instruction is included as early as possible in the shader program (in the sequence of instructions for the shader program), but after any (and all) instructions that (potentially) modify the fragment coverage (including any "discard" instructions), or that generate any side effects.

The test instruction is also included in the shader program before any instructions that will output depth or stencil values (i.e. if the shader outputs depth or stencil values, that happens after the test instruction), and before any instructions that generate blend outputs (i.e. any blend outputs of the shader program happen after the test instruction is (potentially) executed).

Other arrangements would, of course, be possible.

The effect of this then is that the test instruction should be executed as early in the shader program as possible but after any shader program operations that could affect the execution (and/or the ability to execute) the test instruction.

Once all the shader program instructions have been analysed, the compilation of the shader program can be finalised (step 69) and the compiled shader program output to the graphics processing pipeline for execution (step 70).

This is done for some and in an embodiment for all of the shader programs to be executed for a given desired graphics processing output.

FIG. 7 shows some exemplary fragment shader programs that include the test instruction of the present embodiments.

The first shader program 80 shown in FIG. 7 is a relatively simple program, and so the test instruction 81 is included in the program before a first blend instruction 82. The test instruction 81 may be operable, e.g., to determine that the fragment in question can be discarded before executing the blend instruction 82 (and any instructions 83 following that blend instruction).

The second program 84 shown in FIG. 7 includes a discard instruction 85. In this case, the test instruction 81 is placed after the discard instruction 85.

The third program 86 shown in FIG. 7 illustrates a situation where the test instruction 81 is unable to perform the depth and stencil test, for example because the shader program itself operates to generate depth and stencil values for the fragment being processed.

In this case, a further depth/stencil test instruction 87 is included in the shader program to trigger the depth and stencil tests after the test instruction 81. The depth/stencil test instruction 87 operates to send the fragment shader calculated depth and/or stencil values out to the depth and/or stencil test stage of the graphics processing pipeline, which will then perform the relevant depth and/or stencil test and return the results (and either "kill" the fragment or continue its processing, accordingly).

Changes, modifications, and variations to the above-described embodiments would be possible, if desired.

For example, the execution of the test instruction may be dependent upon a depth and/or stencil "age check" for the fragment in question, i.e. whether the fragment has completed an early depth/stencil test or is the oldest fragment at its position that hasn't yet completed the depth/stencil test.

As well as (potentially) updating coverage information, for the fragment in question, the operation or operations that the test instruction triggers can also be used to update other information for the graphics processing operation (e.g., and in an embodiment, that may be relevant to the processing of other fragments). Thus, for example, where the test instruction triggers the performance of a depth test, then the result of that test for the fragment in question is in an embodiment used to update the depth information (e.g. the depth buffer) stored for the graphics processing task in question, e.g., and in an embodiment, so that the depth value(s) for the fragment in question is available for other (e.g. later) fragments to be tested against.

The test instruction could also or instead operate to determine if the alpha value for the fragment being processed has a particular value or values, and trigger and/or perform a particular operation in the event that the alpha value has a particular value or values.

For example, if the blending mode is such that the fragment is always opaque, or alpha blending is enabled and the alpha value for the fragment indicates that the fragment is opaque (i.e. the alpha value is greater than or equal to 1.0), then the test instruction when executed could also operate to trigger the killing off of (stopping the processing of) older fragments having the same position if the fragment in question passes the depth/stencil test (as those older fragments will then be known to be behind an opaque fragment and so cannot be visible). (This operation is in an embodiment implemented using the mechanism described in the Applicant's earlier UK Patent Application GB-A-2511177.)

Similarly, if alpha blending is enabled and the alpha value indicates that the fragment is fully transparent (i.e. is less than or equal to 0.0), then the test instruction if executed could trigger the depth/stencil test for the fragment (as those tests still need to be done), but as a fully transparent fragment cannot affect the colour buffer, also kill (stop) the fragment shader for the fragment in question (discard the fragment) once the depth/stencil tests have been completed.

As can be seen from the above, the technology described herein, in its embodiments at least, provides an improved operation for graphics processing pipelines that include a fragment shading stage.

In particular, in its embodiments at least, the technology described herein can facilitate the earlier determination of the final coverage of a fragment before execution of the fragment shader program completes, thereby facilitating the earlier stopping of a fragment shader program.

It can also allow late depth/stencil tests to be performed earlier in the shader program execution and facilitate simpler triggering of the late depth/stencil tests.

This is achieved, in the embodiments of the technology described herein at least, by including in a fragment shader program to be executed an instruction that will trigger the fragment shader to perform one or more per-fragment operations.

The foregoing detailed description has been presented for the purposes of illustration and description. It is not intended to be exhaustive or to limit the technology described herein to the precise form disclosed. Many modifications and variations are possible in light of the above teaching. The described embodiments were chosen in order to best explain the principles of the technology described herein and its practical application, to thereby enable others skilled in the art to best utilise the technology described herein in various embodiments and with various modifications as are suited to the particular use contemplated. It is intended that the scope of the technology described herein be defined by the claims appended hereto.

The invention claimed is:

1. A method of operating a graphics processing system that includes a graphics processing pipeline circuit, comprising:
including in a fragment shader program to be executed by a programmable fragment shading stage circuit of the graphics processing pipeline circuit, a first graphics program instruction that when executed will cause the programmable fragment shading stage circuit to determine whether a per-fragment operation can be performed for a fragment being processed, and to:
when it is determined, in response to the first graphics program instruction, that the per-fragment operation can be performed for a fragment being processed, trigger the performance of the per-fragment operation for the fragment being processed; and
when it is determined, in response to the first graphics program instruction, that the per-fragment operation cannot be performed for a fragment that is being processed, not trigger the performance of the per-fragment operation for the fragment that is being processed in response to the first graphics program instruction and continue executing the fragment shader program for the fragment that is being processed;
the method further comprising:
including in the fragment shader program to be executed by the programmable fragment shading stage circuit of the graphics processing pipeline circuit, a second graphics program instruction after the first graphics program instruction and a third graphics program instruction before the first graphics program instruction, wherein the third graphics program instruction, when executed, triggers the performance of a first fragment shading operation for the fragment that is being processed, and wherein the second graphics program instruction, when executed, triggers the performance of a second fragment shading operation for the fragment that is being processed; and
the programmable fragment shading stage circuit of the graphics processing pipeline circuit, when executing the fragment shader program to process a fragment:
before executing the first graphics program instruction, performing the first fragment shading operation for the fragment that is being processed in response to the third graphics program instruction;
in response to the first graphics program instruction:
determining whether a per-fragment operation can be performed for the fragment that is being processed; and
when it is determined, in response to the first graphics program instruction, that a per-fragment operation can be performed for a fragment that is being processed, triggering the performance of the per-fragment operation for the fragment that is being processed in response to the first graphics program instruction, to thereby generate the result of the per-fragment operation for the fragment that is being processed; and when it is determined, in response to the first graphics program instruction, that a per-fragment operation cannot be performed for a fragment that is being processed, not triggering the performance of the per-fragment operation for the fragment that is being processed in response to the first graphics program instruction, and continuing execution of the fragment shader program for the fragment that is being processed to continue processing the fragment that is being processed, including executing the second graphics program instruction and, in response to the second graphics program instruction, triggering the performance of the second fragment shading operation for the fragment that is being processed;

wherein the per-fragment operation is at least one of:
an operation that will affect and/or determine the coverage for the fragment that is being processed;
an alpha-to-coverage and/or an alpha test operation; and
a depth and/or a stencil test.

2. The method of claim 1, wherein the per-fragment operation that the first graphics program instruction that is included in the fragment shader program triggers is an operation that will affect and/or determine the coverage for the fragment.

3. The method of claim 1, wherein the per-fragment operation that the first graphics program instruction that is included in the fragment shader program triggers is an alpha-to-coverage and/or an alpha test operation.

4. The method of claim 1, wherein the per-fragment operation that the first graphics program instruction that is included in the fragment shader program triggers is a depth and/or a stencil test.

5. The method of claim 1, wherein the per-fragment operation that the first graphics program instruction triggers is a determination of whether the alpha value for the fragment has a particular value or values, and the first graphics program instruction is further operable to trigger the performance of a particular operation or operations when the fragment has the particular alpha value or one of the particular alpha values.

6. The method of claim 1, wherein the first graphics program instruction is operable to determine if the coverage of the fragment is zero, and to, when the coverage of the fragment is zero, halt execution of the fragment shader program for the fragment.

7. The method of claim 1, wherein the programmable fragment shading stage circuit determines whether the per-fragment operation that the first graphics program instruction relates to should be performed for the fragment based on one or more of:
whether the depth and/or stencil tests for the fragment have been completed when the first graphics program instruction is to be executed;
whether alpha-to-coverage or alpha-test are enabled for the fragment; and
whether the fragment shader program is operable to output depth and/or stencil values.

8. The method of claim 1, comprising including the first graphics program instruction in the fragment shader program after any instructions in the fragment shader program that affect the fragment coverage.

9. The method of claim 1, comprising including the first graphics program instruction in the fragment shader program before any instructions that output depth or stencil values.

10. The method of claim 1, further comprising:
including a further instruction that is operable to trigger the performance of a depth test and/or a stencil test for the fragment in the fragment shader program after the first graphics program instruction that triggers the per-fragment operation.

11. A graphics processing system comprising:
a graphics processing pipeline circuit comprising:
a rasteriser circuit that rasterises input primitives to generate graphics fragments to be processed, each graphics fragment having one or more sampling points associated with it; and
a programmable fragment shading stage circuit which executes fragment shader programs to perform fragment shading operations on graphics fragments generated by the rasteriser;
the graphics processing system further comprising:
a processing circuit configured to include in a fragment shader program to be executed by the programmable fragment shading stage circuit of the graphics processing pipeline circuit, a first graphics program instruction that when executed will cause the programmable fragment shading stage circuit to determine whether a per-fragment operation can be performed for a fragment being processed, and to:
when it is determined, in response to the first graphics program instruction, that the per-fragment operation can be performed for a fragment being processed, trigger the performance of the per-fragment operation for the fragment being processed; and
when it is determined, in response to the first graphics program instruction, that the per-fragment operation cannot be performed for a fragment that is being processed, not trigger the performance of the per-fragment operation for the fragment that is being processed in response to the first graphics program instruction and continue executing the fragment shader program for the fragment that is being processed;
the processing circuit further configured to include in the fragment shader program to be executed by the programmable fragment shading stage circuit of the graphics processing pipeline circuit, a second graphics program instruction after the first graphics program instruction and a third graphics program instruction before the first graphics program instruction, wherein the third graphics program instruction, when executed, triggers the performance of a first fragment shading operation for the fragment that is being processed, and wherein the second graphics program instruction, when executed, triggers the performance of a second fragment shading operation for the fragment that is being processed; and wherein:
the programmable fragment shading stage circuit of the graphics processing pipeline circuit is configured to, when executing the fragment shader program to process a fragment:
before executing the first graphics program instruction, perform the first fragment shading operation for the fragment that is being processed in response to the third graphics program instruction;
in response to the first graphics program instruction:
determine whether a per-fragment operation can be performed for the fragment that is being processed; and
when it is determined, in response to the first graphics program instruction, that a per-fragment operation can be performed for a fragment that is being processed, trigger the performance of the per-fragment operation for the fragment that is being processed in response to the first graphics program instruction, to thereby generate the result of the per-fragment operation for the fragment that is being processed; and when it is determined, in response to the first graphics program instruction, that a per-fragment operation cannot be performed for a fragment that is being processed, not trigger the performance of the per-fragment operation for the fragment that is being processed in response to the first graphics program instruction, and continue execution of the fragment shader program for the fragment that is being processed to continue processing the fragment that is being processed, including executing the second graphics program instruction and, in response to the second graphics program instruction, trigger the performance of the second fragment shading operation for the fragment that is being processed;

wherein the per-fragment operation is at least one of:
an operation that will affect and/or determine the coverage for the fragment that is being processed;
an alpha-to-coverage and/or an alpha test operation; and
a depth and/or a stencil test.

12. The system of claim 11, wherein the per-fragment operation that the first graphics program instruction that is included in the fragment shader program triggers is an operation that will affect and/or determine the coverage for the fragment.

13. The system of claim 11, wherein the per-fragment operation that the first graphics program instruction that is included in the fragment shader program triggers is an alpha-to-coverage and/or an alpha test operation.

14. The system of claim 11, wherein the per-fragment operation that the first graphics program instruction that is included in the fragment shader program triggers is a depth and/or a stencil test.

15. The system of claim 11, wherein the per-fragment operation that the first graphics program instruction triggers is a determination of whether the alpha value for the fragment has a particular value or values, and the first graphics program instruction is further operable to trigger the performance of a particular operation or operations when the fragment has the particular alpha value or one of the particular alpha values.

16. The system of claim 11, wherein the programmable fragment shading stage circuit is configured to, in response to the first graphics program instruction, trigger a determination of whether the coverage of the fragment is zero, and, when the coverage of the fragment is determined to be zero, stop the execution of the fragment shader program for the fragment.

17. The system of claim 11, wherein the programmable fragment shading stage circuit is configured to determine whether the per-fragment operation that the first graphics program instruction relates to should be performed for the fragment based on one or more of:
whether the depth and/or stencil tests for the fragment have been completed when the first graphics program instruction is to be executed;
whether alpha-to-coverage or alpha-test are enabled for the fragment; and
whether the fragment shader program is operable to output depth and/or stencil values.

18. A programmable fragment shading stage circuit for a graphics processing pipeline circuit, comprising:
a processing circuit that executes fragment shader programs to perform fragment shading operations on graphics fragments generated by a rasteriser; and wherein the programmable fragment shading stage circuit is configured to, when executing a fragment shader program to process a fragment:
before executing a first graphics program instruction included in the fragment shader program, perform a first fragment shading operation for the fragment that is being processed in response to a third graphics program instruction that is included in the fragment shader program before the first graphics program instruction;
in response to the first graphics program instruction included in the fragment shader program:
determine whether a per-fragment operation can be performed for the fragment that is being processed; and
when it is determined, in response to the first graphics program instruction, that a per-fragment operation can be performed for a fragment that is being processed, trigger the performance of the per-fragment operation for the fragment that is being processed in response to the first graphics program instruction, to thereby generate the result of the per-fragment operation for the fragment that is being processed; and
when it is determined, in response to the first graphics program instruction, that a per-fragment operation cannot be performed for a fragment that is being processed, not trigger the performance of the per-fragment operation for the fragment that is being processed in response to the first graphics program instruction, and continue execution of the fragment shader program for the fragment that is being processed to continue processing the fragment that is being processed, including executing a second graphics program instruction included in the fragment shader program after the first graphics program instruction and, in response to the second graphics program instruction, trigger the performance of a second fragment shading operation for the fragment that is being processed;
wherein the per-fragment operation is at least one of:
an operation that will affect and/or determine the coverage for the fragment that is being processed;
an alpha-to-coverage and/or an alpha test operation; and
a depth and/or a stencil test.

19. A computer readable non-transitory storage medium storing computer software code which when executing on a data processor performs a method of compiling programs to generate instructions for execution by a programmable fragment shading stage circuit of a graphics processing pipeline circuit, the method comprising:
including in a fragment shader program to be executed by a programmable fragment shading stage circuit of a graphics processing pipeline circuit, a first graphics program instruction that when executed will cause the programmable fragment shading stage circuit to determine whether a per-fragment operation can be performed for a fragment being processed, and to:
when it is determined, in response to the first graphics program instruction, that the per-fragment operation can be performed for a fragment being processed, trigger the performance of the per-fragment operation for the fragment being processed in response to the first graphics program instruction, to thereby generate the result of the per-fragment operation for the fragment that is being processed; and
when it is determined, in response to the first graphics program instruction, that the per-fragment operation cannot be performed for a fragment that is being processed, not trigger the performance of the per-fragment operation for the fragment that is being processed in response to the first graphics program instruction and continue executing the fragment shader program for the fragment that is being processed;

the method further comprising:

including in the fragment shader program to be executed by the programmable fragment shading stage circuit of the graphics processing pipeline circuit, a second graphics program instruction after the first graphics program instruction and a third graphics program instruction before the first graphics program instruction, wherein the third graphics program instruction, when executed, triggers the performance of a first fragment shading operation for the fragment that is being processed, and wherein the second graphics program instruction, when executed, triggers the performance of a second fragment shading operation for the fragment that is being processed;

wherein the per-fragment operation is at least one of:

an operation that will affect and/or determine the coverage for the fragment that is being processed;

an alpha-to-coverage and/or an alpha test operation; and a depth and/or a stencil test.

20. The computer readable non-transitory storage medium of claim 19, wherein the first graphics program instruction is included in the fragment shader program after any instructions in the shader program that affect the fragment coverage.

21. The computer readable non-transitory storage medium of claim 19, wherein the first graphics program instruction is included in the fragment shader program before any instructions that output depth or stencil values.

22. The computer readable non-transitory storage medium of claim 19, wherein the method further comprises:

including a further instruction that is operable to trigger the performance of a depth test and/or a stencil test for the fragment in the fragment shader program after the first graphics program instruction that triggers the per-fragment operation.

\* \* \* \* \*